United States Patent [19]

Stapleton

[11] Patent Number: 5,596,351
[45] Date of Patent: Jan. 21, 1997

[54] INK LEVEL SENSING ON A PEN CARRIAGE IN A PEN PLOTTER

[75] Inventor: Jeffrey Stapleton, Huntington Beach, Calif.

[73] Assignee: Calcomp Inc., Anaheim, Calif.

[21] Appl. No.: 164,085

[22] Filed: Dec. 8, 1993

[51] Int. Cl.$^6$ ............ G01D 18/00; G01F 23/00; B41J 2/01
[52] U.S. Cl. ............ 347/7; 250/577; 340/619; 346/140.1; 364/509
[58] Field of Search ............ 347/7, 5, 37; 346/17, 346/29, 49, 139 R, 140.1; 73/290 R, 307, 308, 293; 116/109, 227; 101/364, 366; 401/194; 340/612, 618, 619, 450, 450.2; 364/509, 507, 422, 571.01, 571.02; 137/386, 392, 551, 558; 250/573, 577

[56] References Cited

U.S. PATENT DOCUMENTS

| | | | |
|---|---|---|---|
| 3,881,651 | 5/1975 | Wilhelm, Jr. | 235/151.13 |
| 4,160,168 | 7/1979 | Funck | 250/564 |
| 4,402,048 | 8/1983 | Tsuchida et al. | 364/442 |
| 4,509,044 | 4/1985 | Yachida | 364/509 X |
| 4,677,572 | 6/1987 | Gunderson et al. | 346/49 X |
| 4,733,095 | 3/1988 | Kurahashi et al. | 250/577 |
| 4,768,377 | 9/1988 | Hablemann et al. | 340/618 X |
| 4,788,444 | 11/1988 | Williams | 250/577 |
| 4,829,448 | 5/1989 | Balding et al. | 364/509 |
| 4,889,442 | 12/1989 | Takagi et al. | 401/194 |
| 5,033,896 | 7/1991 | Lytle et al. | 401/192 |
| 5,073,720 | 12/1991 | Brown | 250/577 |
| 5,250,957 | 10/1993 | Onozato | 347/7 |

*Primary Examiner*—Alrick Bobb
*Attorney, Agent, or Firm*—Michaelson & Wallace

[57] ABSTRACT

An apparatus for sensing whether a liquid with a turbulent surface and contained within a vessel has fallen to a level where the liquid is substantially expended. The apparatus includes a light source for emitting light, a light sensor which is sensitive to the light emitted by the light source and which outputs a signal proportionate to the amount of light sensed, and logic for determining from fluctuations in the signal output by the light sensor when the liquid has fallen to the level in the vessel where the liquid is substantially expended. The fluctuations in the signal are caused by randomness in reflections of the emitted light due to the turbulence of the surface of the liquid. Where the vessel has a closed top and the liquid initially fills the vessel, the logic additionally uses the magnitude of the signal from the light sensor to determine when the liquid has fallen to the level where it is substantially expended. The magnitude of the signal is employed to distinguish between a condition in which the vessel is full and the turbulence of the surface of the liquid is dampened by the closed top of the vessel and a condition in which the level of the liquid has fallen to approximately the level where the liquid is substantially expended.

20 Claims, 3 Drawing Sheets

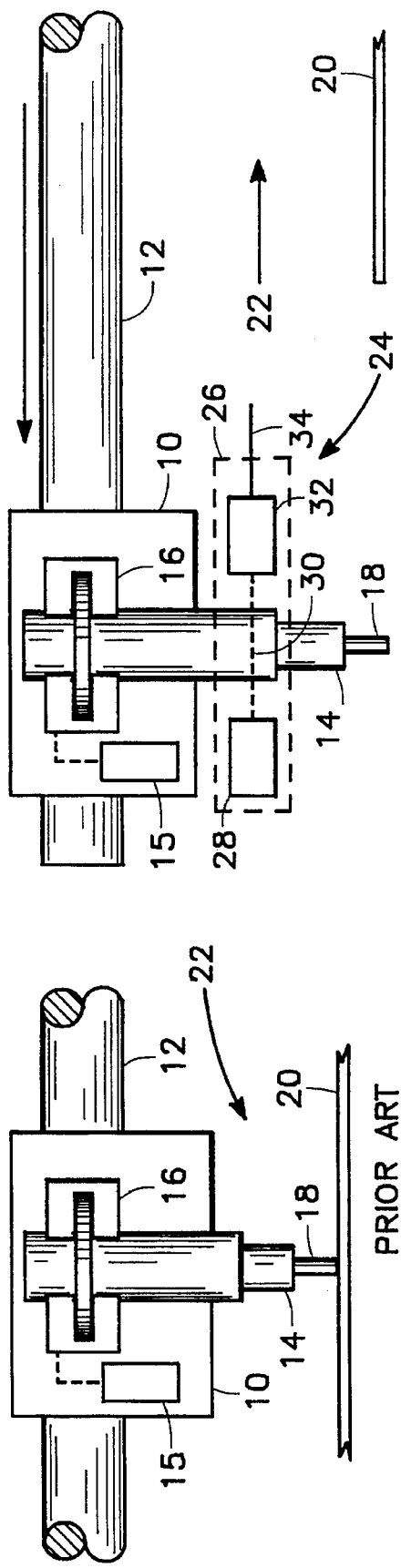
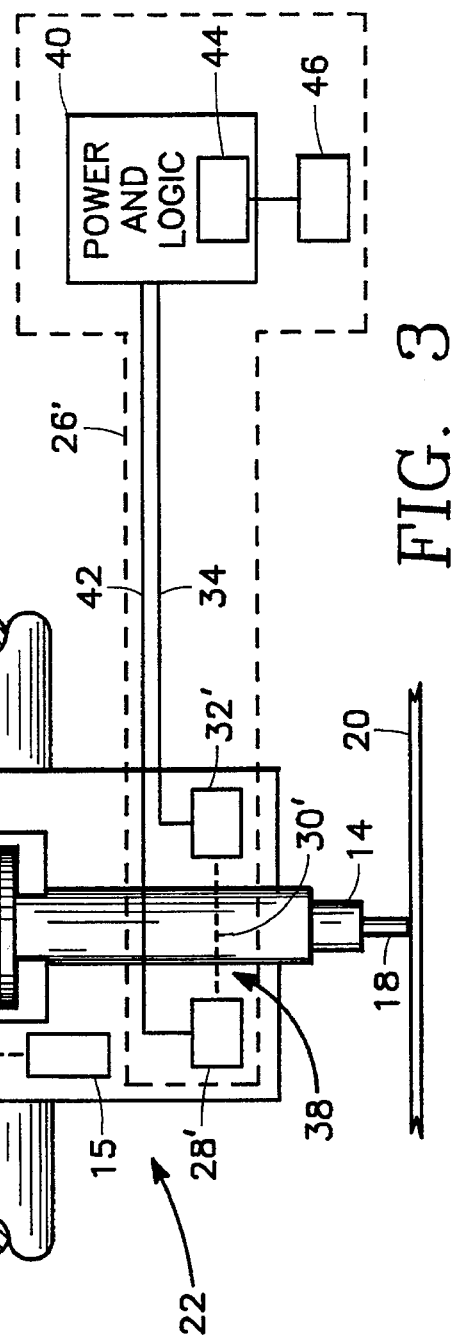
FIG. 1 PRIOR ART
FIG. 2 PRIOR ART
FIG. 3

INK LEVEL SENSING ON A PEN CARRIAGE IN A PEN PLOTTER

BACKGROUND OF THE INVENTION

1. Technical Field

This invention relates to an apparatus for sensing whether a liquid with a turbulent surface and contained within a vessel has fallen to a level in the vessel where the liquid is substantially expended, and, in one specific embodiment to, sensing whether the ink in the pen of a pen plotter is substantially expended while the pen is in motion.

2. Background Art

Pen plotters are well known in the plotting art. As depicted in FIG. 1, a typical pen plotter includes a pen carriage 10 which slides laterally on a support beam 12 to produce vectors in one axis of the plotter's coordinate system. The pen carriage 10 carries a pen 14 in its gripping fingers 16. The pen 14 is lifted and lowered by a mechanism 15. The pen 14 is filled with a liquid ink which flows from the tip 18 onto the plotting media 20 to create the plot. Over time, therefore, the ink within the pen 14 is consumed. To assure that the pen 14 does not run out of ink during a plot, therefore, the level of the ink remaining within the pen 14 should be checked periodically.

In FIG. 1, the pen 14 and pen carriage 10 are positioned over the plot portion of the plotting media 20. As depicted in FIG. 2, in prior art plotters the pen 14 and pen carriage 10 are moved from the plotting position 22 to an off-line position 24 for ink level sensing. A level sensing system 26 is located at the off-line position 24. The level sensing system 26 can be optical or capacitance in operation, by way of example. In an optical system, a light source 28 transmits a light beam 30 through the transparent body of a pen 14 to be received by a light sensor 32 which generates an electrical signal on line 34 when the light beam 30 is not blocked by the opaque ink. The light source 28 and light sensor 32 are at a fixed level with respect to the body of the of the pen 14 corresponding to the level at which the pen 14 is out of or nearly out of ink. The sensing system 26, therefore, indicates when the level of the ink within the pen 14 has fallen to the aforementioned fixed level.

While the above-described level sensing system 26 works for its intended purpose, it has certain drawbacks. When the pen 14 has been in use, the ink may be frothing and partially coating the sides of the inside of the pen body such that some time must be allowed at the off-line position 24 for the ink to settle before making the level reading. Therefore, the plotting process must be stopped periodically to check the ink level. This, of course, takes time away from the plotting process.

In addition, the level of the ink within the pen at which the system is keyed to indicate that the pen 14 needs to be replaced must be chosen carefully. The lower the preset "empty" threshold is set, the less ink is wasted by changing pens before the ink is totally consumed. However, the lower the threshold is set, the more often the level testing must take place to assure that the pen 14 will not run out of ink during plotting. Since the plotting must be stopped to allow the ink to settle, considerable amounts of plotting time would be lost if the ink level is checked frequently. Consequently, the total throughput of the plotter goes down. On the other hand, if the ink level is tested less frequently, the threshold must be set high enough to ensure that adequate amounts of ink remain between tests, so that the pen 14 will not run out of ink during plotting. Consequently, ink is wasted by replacing the pen 14 while significant amounts of ink still remain. Accordingly, there is a tradeoff between wasting ink and losing plotting time.

An optimum approach would be to sense the ink level of the pen 14 as it is gripped by the gripping fingers 16 and in motion on the pen carriage 10. Unfortunately, the above-described frothing and coating action of the ink within the body of the pen 14 has made such dynamic testing of the ink level impossible in the prior art.

Wherefore, it is an object of the present invention to provide a method and apparatus for sensing if the level of ink within a plotter pen has fallen to a level where the ink is substantially expended while on the pen carriage.

It is another object of the present invention to provide a method and apparatus for sensing if the level of ink within a plotter pen has fallen to a level where the ink is substantially expended, while the pen carriage is in use.

It is still another object of the present invention to provide a method and apparatus for sensing if the level of ink within a plotter pen has fallen to a level where the ink is substantially expended without the need to allow frothing and coating ink to settle within the pen body before measuring.

It is yet another object of this invention to provide a method and apparatus for sensing if the level of ink within a plotter pen has fallen to a level where the ink is substantially expended such that a minimum of ink is wasted without the lose of plotting time.

Other objects and benefits of the invention will become apparent from the detailed description which follows hereinafter when taken in conjunction with the drawing figures which accompany it.

SUMMARY

The foregoing objects has been attained generally by an apparatus for sensing whether a liquid with a turbulent surface and contained within a vessel has fallen to a level where the liquid is substantially expended. The apparatus includes a light source for emitting light, a light sensor which is sensitive to the light emitted by the light source and which outputs a signal proportionate to the amount of light sensed, and logic for determining from fluctuations in the signal output by the light sensor when the liquid has fallen to the level in the vessel where the liquid is substantially expended. The fluctuations in the signal are caused by randomness in reflections of the emitted light due to the turbulence of the surface of the liquid.

In one version of the invention where the vessel has a closed top and the liquid initially fills the vessel, the logic additionally uses the magnitude of the signal from the light sensor to determine when the liquid has fallen to the level where it is substantially expended. The magnitude of the signal is employed to distinguish between a condition in which the vessel is full and the turbulence of the surface of the liquid is dampened by the closed top of the vessel and a condition in which the level of the liquid has fallen to approximately the level where the liquid is substantially expended. This is possible because the magnitude of the signal is larger in the later case than the magnitude of the signal when the vessel is full.

This above-described apparatus is employed for a pen plotter in a preferred version of the invention such that the vessel is a plotting pen, the liquid is plotting pen ink, and the turbulent surface of the ink is created by movements of a pen carriage during plotting operations. The light source emits light at near infrared frequencies and is disposed on one side of the plotting pen at a point near its tip and the light sensor is disposed on the other side of the vessel generally opposed to the light source. The portions of the plotting pen interposed between the light source and the light sensor are transparent to the infrared light emitted by the light source. A low ink level signal device for signaling a user is also included. The logic interrupts plotting operations in the pen plotter and activates the low ink level signal device whenever the ink has fallen to the level in the plotting pen where it is substantially expended. However, in pen plotters which have a plurality of plotting pens and more than one is used in the plotting operations, the logic interrupts the plotting operations only after all the plotting pens being employed in the plotting operations have been used.

This preferred embodiment accomplishes all the objects of the invention. The level of the ink in the pen is sensed on the pen carriage itself rather than some off-line location. In addition, the ink level is sensed while the pen carriage is in motion. It does not matter that the ink's surface is turbulent and that the ink is frothing because it is these very aspects that are employed to determine its level. Therefore, there is no need to allow the ink to settle, thereby wasting plotting time and decreasing plotter throughput. In addition, this elimination of lost plotting time is accomplished while still ensuring a minimum amount of ink is wasted. A minimum amount of ink is wasted because the on-line aspect of the invention allows almost continuous testing of the level of the ink. Therefore, the plotting operation need not be interrupted until the level of the ink is substantially expended, and so very little ink is wasted.

DESCRIPTION OF THE DRAWINGS

These and other features, aspects, and advantages of the present invention will become better understood with regard to the following description, appended claims, and accompanying drawings where:

FIG. 1 is a simplified front view drawing of the pen carriage of a prior art pen plotter at its plotting position.

FIG. 2 is a simplified front view drawing of the pen carriage of the prior art pen plotter of FIG. 1 moved from its plotting position to an off-line position for ink level sensing.

FIG. 3 is a simplified front view drawing of the pen carriage of a pen plotter according to the present invention shown at its plotting position and including apparatus for ink level sensing during plotting.

DETAILED DESCRIPTION OF THE PREFERRED EMBODIMENT

Figure 4:
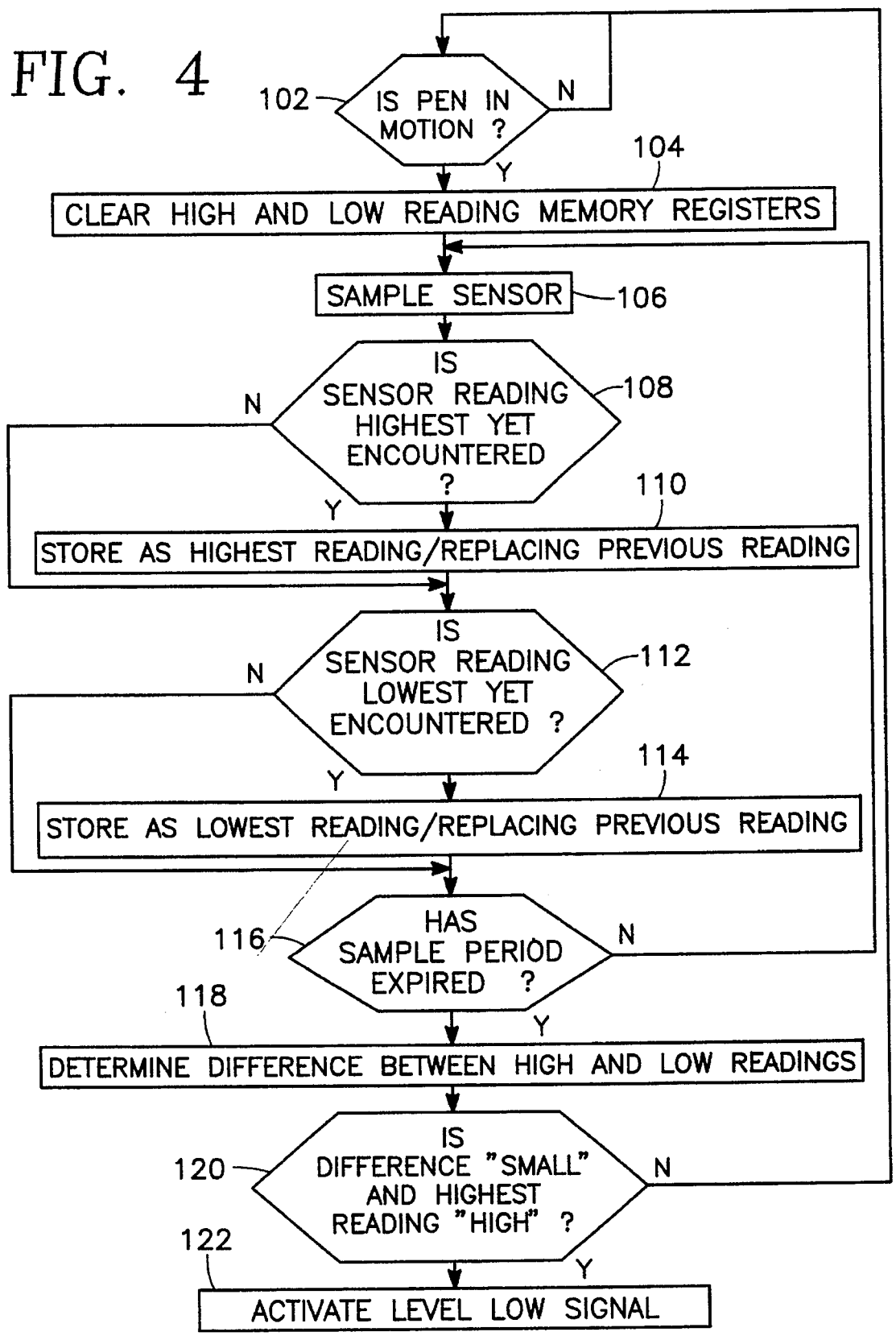
FIG. 4 is a flowchart of the logic employed for on-line ink level sensing according to the present invention.

A pen carriage 10' according to the present invention is shown in FIG. 3. Like components to the prior art pen carriage 10 of FIGS. 1 and 2 are shown with like numbers. Thus, the gripping fingers 16 and the pen lift/lower mechanism 15 are standard. For purposes of the present invention, an optical level sensing system 26' is mounted on the pen carriage 10'. In the preferred level sensing system 26' the pen body has a level sensing portion 38 which is transparent to near infrared light. The light source 28' contains a light emitting diode which emits a light beam 30' of near infrared light. The light sensor 32' senses near infrared light and emits an electrical signal on line 34 in response thereto. The line 34 is connected as an input to the power and logic module 40. Line 42 from the power and logic module 40 is connected to provide power to the light source 28'. The ink level detecting logic 44 is contained within the power and logic module. This logic 44 is used to determine when the level of the ink within the pen 14 has reached a point where the pen 14 must be replaced. Once this point is reached, the ink level detecting logic 44 interrupts the plotting process and a low ink level signal 46 is activated. However, if the plotting process involved the use of a group of pens, as might occur with a multi-pen capable plotter, the plotting process would continue with any of the remaining pens designated for use in the plot. Only after all the designated pens have been used would the plotting stop and the low ink level signal 46 activated. In either case, the interrupted plotting process is reinstated when the pen that was low on ink is replaced by the user.

The present invention takes advantage of a physical phenomenon in two different ways to determine when the level of the ink in the pen 14 has reached the point where the pen 14 must be replaced. Essentially, the physical phenomenon exploited is that the top surface of the ink will reflect light erratically when it is in a turbulent state. Such a turbulent state occurs during plotting when the pen is in motion. If the ink in the pen 14 partially transmits the light from the light source 28', the phenomenon is exploited in the following way. The light from the light source 28' will penetrate the wall of the pen body and radiate out through the ink. A portion of the light will travel directly through the ink and the opposite wall of the pen body to the light sensor 32'. However, another portion of the light will be reflected back into the ink by the interior walls of the pen body, or by the top surface of the ink. Eventually, some of this reflected light will also find its way to the light sensor 32'. When the pen 14 is full, the light paths through the ink are the longest since the portion of the light reflected off the top surface must necessarily travel farther than if the ink level was lower. Therefore, it might be expected that a maximum amount of the light would be absorbed when the pen is full, with the least amount transmitted to the light sensor 32'. Further, it might be expected that as the level of the ink drops, more light will reach the light sensor 32' because the light paths are shorter. However, this turns out not to be the case when the pen 14 is in motion, as it would be during plotting. Because the pen 14 is in motion, considerable sloshing of the ink occurs, except when the pen is completely full and the ink has no room to move. This sloshing causes the ink to froth (i.e. bubble) and the top surface of the ink to be turbulent. As inferred above, the top surface of the ink acts as a mirror. In addition, the bubbles created by the frothing also act as tiny mirrors. Therefore, the light impinging on the top surface or a bubble could be reflected in any direction depending on the angle of incidence and the inclination of the portion of the surface struck or the position of the bubble. As stated above, this phenomenon causes a very erratic reflection pattern which in turn causes a shift in the light paths. Depending on the random reflections, the light captured by the light sensor 32' may be higher or lower than if the surface was still and no bubbles existed. Therefore, it is impossible to determine the level of the ink by this method when the pen 14 is in motion. However, the randomness of the amount of light reaching the light sensor 32' can be exploited to indicate that there is still ink left in the pen 14. This is because, as the ink level becomes very low, the choppiness and frothing of the top surface of the ink tends to subside, simply because there is less ink to slosh around. Therefore, the randomness of the amount of light reaching the light sensor 32' also subsides, and the readings become more consistent.

Accordingly, when the pen 14 is full, the amount of light captured at the light sensor will be very low due to the long light paths. In addition, since the top of the pen will dampen any turbulence the surface might have experience due to the motion of the pen 14, the readings from the light sensor will be substantially consistent. When the pen is not full, but still has sufficient amounts of ink remaining to effect plotting, the amount of light reaching the light sensor 32' can vary greatly from one reading to another due to the turbulence and frothiness of the surface of the ink. Therefore, it can be expected that a considerable spread would exist between the lowest reading and the highest reading from the light sensor over a sample period. And finally, when the ink level gets very low, the amount of light reaching the light sensor will be much higher than when the pen was full because the light paths are much shorter. In addition, since the choppiness and frothing will have somewhat subsided, the readings will become more consistent than when the pen still had sufficient ink remaining. Therefore, it is possible to set a lower threshold for the excursion between the highest reading over a sample period and the lowest reading such that when this lower threshold is reached, and the sensor readings are higher than seen when the pen was full, the pen is determined to be low on ink.

It should be noted that all liquids are to some extent partially transmissive. However, some liquids are so transmissive that very little of the light would be absorbed no matter how long the light paths. Therefore, the light sensor 32' employed with such highly transmissive liquids would have to be extremely sensitive to minute changes in the amount of light captured. This is not a problem with typical plotting inks. Even the most transmissive plotting ink known to the this patent applicant absorbs enough of the light to allow the use of a common inexpensive light sensor 32', and still get a readable difference between the highest and lowest readings due to the choppiness and frothing of the surface.

However, some plotting inks are almost completely opaque, thereby absorbing most of the light. A second way of exploiting the aforementioned phenomenon is used in the case where the ink used in the pen 14 absorbs most of the light from the light source 28'. In this case, there is practically no signal from the light sensor 32' until the top surface of the ink gets to a point coincident to the line of sight between the light source 28' and the light sensor 32'. At this point, the turbulence and frothing of the ink will cause a portion of the light directed toward the receiver 32' to be reflected away or absorbed by the ink. The amount of light so reflected or absorbed will vary with the changing shape of the surface of the ink and the positions of the bubbles. Therefore, just as in the first case, the signal from the light sensor will be erratic, with distinct highs and lows. However, the excursion between the highest signal and the lowest signal from the light sensor 32', over a sample period, will eventually reach the same threshold chosen for the case the light is being partially transmitted through the ink itself. This result occurs because, as before, the turbulence of the surface tends to subside when the ink level gets low. In addition, this point will be reached before all the ink is gone, so the pen 14 will not run completely dry before the plotting is interrupted.

So as can be seen, the same optical level sensing system 26' can be employed with partially transmissive inks or inks that are opaque with the same results. In reality, both the described mechanisms will occur to some extent. The more opaque the ink, the more the second mechanism comes into play. However, again, the result is the same. When the ink level gets low, the threshold is reached, and pen 14 is determined to require replacement.

Given the above-described circumstances, it is possible to determine when the ink level has fallen to a point where the pen requires replacement while the plotting process is taking place. If the readings taken from the light sensor 32' over a sample period are low and consistent, then the pen is full and does not need to be replaced. If the highest reading during the time period is significantly different from the lowest reading for the time period, the pen still has adequate amounts of ink, and does not require replacement. Only when the readings are high and the difference between the highest and lowest readings small, is it known that the pen is low on ink and requires replacement. Accordingly, the optical level sensing system 26' is designed to differentiate between these three conditions, and to interrupt plotting and activate a low ink level signal 46 only when the later occurs.

Figure 5:
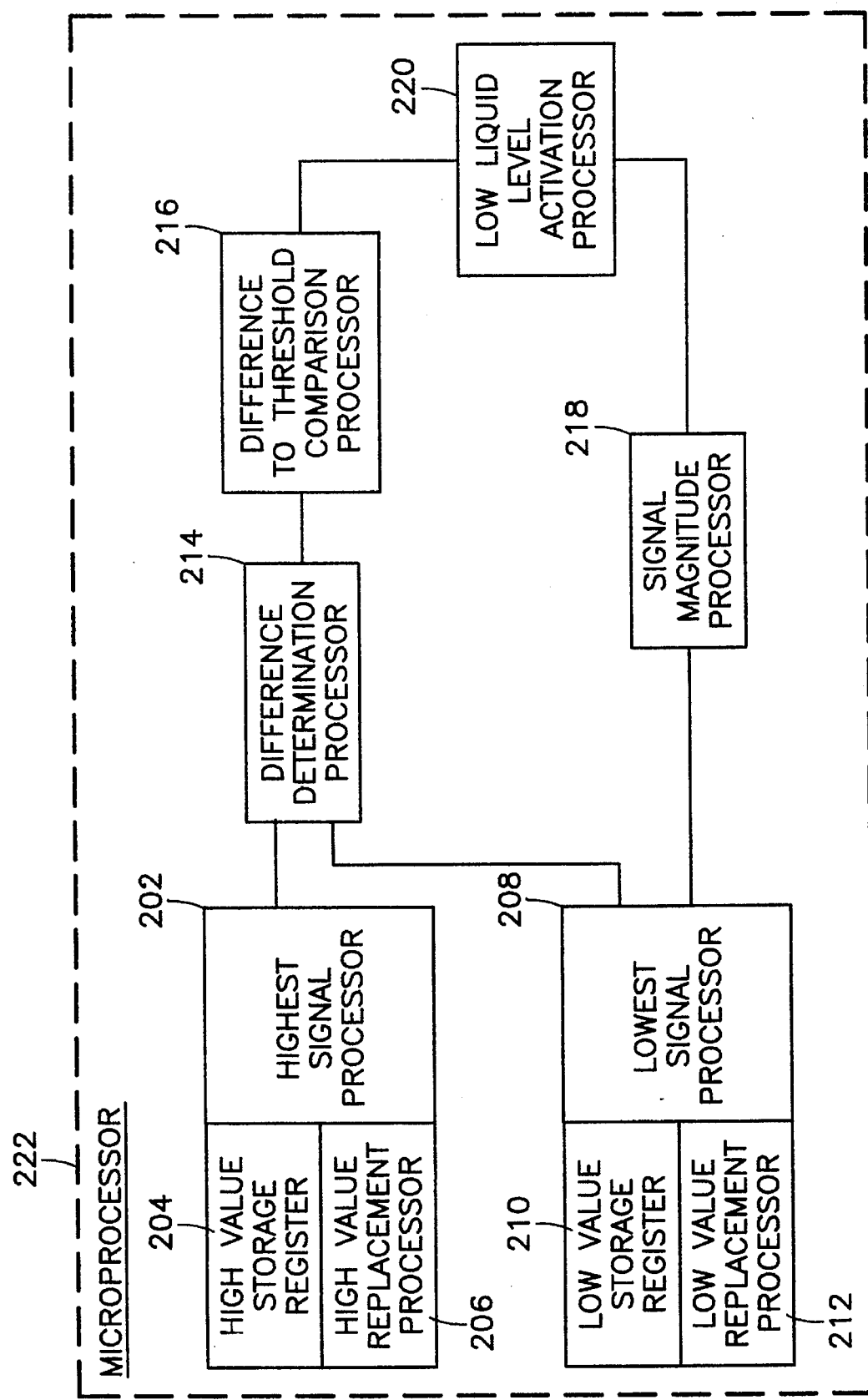
FIG. 5 is a simplified block diagram of a microprocessor implementing the logic of FIG. 4.

This differentiation process is accomplished by the ink level detecting logic 44 included within the power and logic module 40. FIG. 4 shows the detailed operational process that accomplishes the task. The process begins with a pen motion detecting step 102. In this step 102 it is determined whether the pen carriage 10' is in motion. The process is not initiated if the pen carriage 10' is not in motion. However, if the pen carriage 10' is in motion, the process proceeds first to a memory register clearing step 104 wherein the high and low value storage registers 204, 210 (as shown in FIG. 5) are cleared, and then to a sensor sampling step 106. In this later step 106, a sensor reading is obtained. A subsequent highest reading determination step 108 is the next to be executed. The purpose of this step 108 is to decide if the sensor reading is the highest yet encountered in the current sample period. If so, the process proceeds to a high reading storage step 110 wherein the reading is stored, thereby replacing any previously stored reading. If, however, the sensor reading was not the highest yet encountered, this storage step 110 is skipped. After the sensor reading has been either stored or that step 110 skipped, a lowest reading determination step 112 is undertaken. In this step 112, it is determined whether the sensor reading is the lowest yet encountered in the current sample period. If so, the process continues to a low reading storage step 114 wherein the reading is stored. Here too, any previous reading is replaced. It should be noted that if the process is in the first cycle within a given sample period, the lowest reading and the highest reading will be the same, as these readings will always be higher than the reset value of the high and low value storage registers 204, 210 (as shown in FIG. 5). This condition is of no consequence to the overall process because any given time period will always have more than one cycle. If the sensor reading is not the lowest yet encountered, the low reading storage step 114 is skipped. The next step in the process is a sample period expiration step 116 used to determine if the sample period time has expired. If not, the process described so far is repeated from the sensor sampling step 106 onward. If the sample period time has expired though, the process will proceed to a difference determination step 118 wherein the difference between the highest reading encountered during the just elapsed sample period and the lowest reading for the same period is determined. The process continues with a low ink indication step 120. In this step 120, it is determined if the difference between the stored high reading and low reading is small (i.e. less than the aforementioned lower threshold), and if the lowest reading is high (i.e. as compared to the readings associated with a full pen). As mentioned above, this condition equates to a pen that is low on ink. If this condition does not exist, the entire process is started over. However, if this condition does exist, the process proceeds to the signal activation step 124. In this final step 124, the plotting process is interrupted and the low ink level signal 46 is activated on the pen plotter to inform the user that the pen requires replacement.

The structure of the ink level detecting logic 44 which accomplishes the above-disclosed operational process is shown in FIG. 5. The highest signal level output from the light sensor over the sample period is determined via the highest signal processor 202. The highest signal processor 202 employs a high value storage register 204 to store this highest value, and a high value replacement processor 206 to replace the previous contents of the high value storage register 204 and store the new high value if it exceeds the previously stored value. Similarly, the lowest signal level output from the light sensor over the sample period is determined via the lowest signal processor 208. The lowest signal processor 208 employs a low value storage register 210 to store this lowest value, and a low value replacement processor 212 to replace the previous contents of the low value storage register 210 and store the new low value if it is less than the previously stored value. The highest and lowest values stored in the high and low registers 204, 210, respectfully, are transferred to the difference determination processor 214 once the sample period has expired. The difference determination processor 214 derives the difference between the highest and lowest values. This difference is then transferred to the difference-to-threshold comparison processor 216. This processor 216 determines whether the difference between the highest and lowest values is less than the threshold value. In addition, when the sample period has expired, the signal magnitude processor 218 determines if the lowest signal level output from the light sensor during the period and stored in the low value storage register, is larger in magnitude than the signal typically output when the pen is full. The outputs of the difference-to-threshold comparison processor 216 and signal magnitude processor 218 are transferred to the low liquid level activation processor 220. The activation processor 220 interrupts the plotting process and activates the low ink level signal, if the difference between the highest and lowest signal levels is less than the threshold value and the magnitude of the lowest signal level is larger than typically output when the pen is full. In the preferred version of this invention, a microprocessor 222 is employed which includes the necessary storage registers, and the above-described processors are implemented using software routines. The methods and devices employed in such an implementation are well known in the art. Therefore, no detailed description is included herein.

As discussed previously, the prior art ink level sensing systems required the pen 14 to be brought off-line and the ink settled, before a determination of whether the pen 14 needed to be replaced could be accomplished. A tradeoff existed between the number of testing cycles and the amount of ink wasted. If more testing cycles were used, plotter throughput suffered. If the number of testing cycles was minimized, then the amount of ink left in the pen 14 before it was deemed to require replacement had to be increased to ensure the pen 14 did not run out of ink during plotting. In accordance with the present invention, the ability to sense when the pen 14 needs to be replaced during actual plotting, eliminates the wasted plotting time caused by off-line testing, and improves throughput. In addition to this advantage, the wasting of ink is eliminated as well. The number of testing cycles is irrelevant to plotter throughput in the present invention due to the on-line test capability. Therefore, there is no need to ensure a significant reserve of ink is present to reduce the number of testing cycles. In the preferred version of this invention, testing occurs continuously whenever the pen 14 is in motion. Accordingly, the optical level sensing system 26' can be placed very near the bottom of the pen 14, and the lower threshold discussed above can be set so as to trigger only when relatively little ink remains. This minimizes any wasting of ink.

In testing the preferred version of the present invention with its near infrared light source 28' and light sensor 32' sensitive to that range of light frequencies, it was found that the preferred threshold value was less than 0.1 volts. This value equates to the excursion between the highest and lowest light sensor 32' readings over a sample period, which in combination with the readings also being high in comparison to those associated with a full pen 14, would indicate the pen 14 is low on ink. A threshold value of less than 0.1 volts is preferred because such a value ensures that a minimum amount of ink will be wasted, while allowing the use of typical plotter inks ranging from the most transmissive known to the patent applicant all the way to completely opaque inks. The preferred light sensor signal that would indicate the reading was higher than that associated with a full pen 14, is greater than 0.5 volts. The preferred sample period is thirty samples. As discussed previously, the samples are taken only during times when the pen is in motion. Therefore, it is possible that the sample period could span more than one individual pen motion depending on the time required for each sample to be taken. The preferred time for each sample is as short a time as possible.

While the invention has been described in detail by reference to the preferred embodiment described above, it is understood that variations and modifications thereof may be made without departing from the true spirit and scope of the invention. For example, the above-described version of the invention could be employed to detect a low fluid level in other systems and applications as well. The only requirements are that the fluid involved have or be made to have a turbulent surface. In addition, even though an object of this invention was to minimize the amount of ink left in the pen when it is replaced, the lower threshold limit in the case of a more transmissive fluid could be set higher so as to ensure some pre-determined amount of fluid remains, as a reserve, when the threshold is reached.

Wherefore, what is claimed is:

1. An apparatus for sensing whether a liquid with a turbulent surface and contained within a vessel has fallen to a level in the vessel where the liquid is substantially expended, the apparatus comprising:

(a) a light source towards the vessels emitting light;

(b) a light sensor which senses the light emitted by the light source, a portion of said emitted light being reflected from the turbulence surface, and outputs a signal proportionate with an amount of light sensed; and, (c) logic means for determining from fluctuations in the signal output by the light sensor when the liquid has fallen to the level in the vessel where the liquid is substantially expended, wherein the fluctuations in the signal are caused by randomness in the reflections of the emitted light due to the turbulence of the surface of the liquid, and wherein, (d) the apparatus includes only one said light source and only one said light sensor.

2. The apparatus of claim 1 wherein the logic means for determining when the liquid has fallen to the level where the liquid is substantially expended comprises:

(a) first processor means for determining a highest signal output level output from the light sensor over a sample period;

(b) second processor means for determining a lowest signal output level output from the light sensor over the sample period;

(c) third processor means for determining a difference between the highest signal output level and the lowest signal output level; and, (d) fourth processor means for determining whether the difference between the highest signal output level and the lowest signal output level is less than a threshold value generally corresponding to the level in the vessel where the liquid is substantially expended.

3. The apparatus of claim 2 wherein:

(a) the first processor means for determining the highest signal output level includes, (a1) a first storage register for storing a signal output level output from the light sensor, and, (a2) first replacement processor means for replacing previous contents of the first storage register and storing a current signal output level output from the light sensor whenever the current signal output level exceeds in magnitude the previous contents of the first storage register; and, (b) the second processor means for determining the lowest signal output level includes, (b1) a second storage register for storing a signal output level output from the light sensor, and, (b2) second replacement processor means for replacing previous contents of the second storage register and storing a current signal output level output from the light sensor whenever the current signal output level is lower in magnitude than the previous contents of the second storage register.

4. The apparatus of claim 1 wherein:

(a) the vessel has a closed top;

(b) the liquid initially fills the vessel; and, (c) the logic means further includes signal magnitude processor means for determining from a magnitude of the signal when the liquid has fallen to the level in the vessel where the liquid is substantially expended by distinguishing between a condition in which the vessel is full and the turbulence of the surface of the liquid is dampened by the closed top of the vessel, and a condition in which the level of the liquid has fallen to approximately the level where the liquid is substantially expended.

5. The apparatus of claim 4 wherein the magnitude of the signal from which the signal magnitude processor means determines when the liquid has fallen to the level in the vessel where the liquid is substantially expended is larger than a magnitude of the signal output by the light sensor when the vessel is full.

6. The apparatus of claim 1 wherein the turbulent surface of the liquid is created by a means for causing the vessel to move.

7. The apparatus of claim 6 wherein:

(a) the vessel is a plotting pen;

(b) the liquid is plotting pen ink;

(c) the light source emits light at near infrared frequencies; and, (d) the means for causing the vessel to move comprises a pen carriage in a pen plotter.

8. The apparatus of claim 7 wherein:

(a) the light source is disposed on a first side of the plotting pen at a point near the bottom of the plotting pen;

(b) the light sensor is disposed on a second side of the plotting pen generally opposed to the light source;

(c) portions of the plotting pen interposed between the light source and the light sensor are transparent to light emitted by the light source.

9. The apparatus of claim 1 further comprising:

(a) a low liquid level signal means for signaling a user; and wherein, (b) the logic means includes a low liquid level activation processor means for activating the low liquid level signal means whenever the liquid has fallen to the level in the vessel where the liquid is substantially expended.

10. A method for sensing whether a liquid with a turbulent surface and contained within a vessel has fallen to a level in the vessel where the liquid is substantially expended, the method comprising the steps of:

(a) emitting light from a light source towards the vessel;

(b) outputting a signal from a light sensor which senses a portion of said emitted light being reflected from the turbulence surface to the light emitted by the light source, a portion of said emitted light being reflected from the turbulence surface, the signal being proportionate with an amount of light sensed; and, (c) determining from fluctuations in the signal output by the light sensor when the liquid has fallen to the level in the vessel where the liquid is substantially expended, wherein the fluctuations in the signal are caused by randomness in the reflections of the emitted light due to the turbulence of the surface of the liquid, and wherein, (d) the apparatus includes only one said light source and only one said light sensor.

11. The method of claim 10 wherein the step of determining when the liquid has fallen to the level in the vessel where the liquid is substantially expended comprises the steps of:

(a) determining a highest signal output level output from the light sensor over a sample period;

(b) determining a lowest signal output level output from the light sensor over the sample period;

(c) determining a difference between the highest signal output level and the lowest signal output level; and (d) determining whether the difference between the highest signal output level and the lowest signal output level is less than a threshold value generally corresponding to the level in the vessel where the liquid is substantially expended.

12. The method of claim 11 wherein:

(a) the step of determining the highest signal output level includes, (a1) storing a signal output level output from the light sensor in a first storage register, and, (a2) replacing previous contents of the first storage register and storing a current signal output level output from the light sensor whenever the current signal output level exceeds in magnitude the previous contents of the first storage register; and, (b) the step of determining the lowest signal output level includes, (b1) storing a signal output level output from the light sensor in a second storage register, and, (b2) replacing previous contents of the second storage register and storing a current signal output level output from the light sensor whenever the current signal output level is lower in magnitude than the previous contents of the second storage register.

13. The method of claim 10, wherein the vessel has a closed top and the liquid initially fills the vessel, further includes the step of determining from a magnitude of the signal when the liquid has fallen to the level in the vessel where the liquid is substantially expended by distinguishing between a condition wherein the vessel is full and the turbulence of the surface of the liquid is dampened by the closed top of the vessel, and a condition wherein the level of the liquid has fallen to the level where the liquid is substantially expended.

14. The method of claim 13 wherein the step of determining from a magnitude of the signal when the liquid has fallen to the level in the vessel where the liquid is substantially expended comprises determining when the magnitude of the signal is larger than a magnitude of the signal output by the light sensor when the vessel is full.

15. The method of claim 10 wherein the turbulent surface of the liquid is created by the further step of causing the vessel to move.

16. The method of claim 10 further comprising the step of signaling a user with a low liquid level signal whenever the liquid has fallen to the level in the vessel where the liquid is substantially expended.

17. An apparatus for sensing whether a liquid with a turbulent surface and contained within a vessel with a closed top has fallen from a level where the liquid initially fills the vessel to a level where the liquid is substantially expended, the apparatus comprising:

(a) a light source for emitting light towards the vessels;

(b) a light sensor which senses the light emitted by the light source a portion of said emitted light being reflected from the turbulence surface, and outputs a signal proportionate with an amount of light sensed;

(c) logic means for determining from fluctuations and a magnitude of the signal output by the light sensor when the liquid has fallen to the level in the vessel where the liquid is substantially expended wherein the fluctuations in the signal are caused by randomnegs in reflections of the emitted light due to the turbulence of the surface of the liquid, and wherein, (d) the apparatus includes only one said light source and only one said light sensor.

18. The apparatus of claim 17 wherein the apparatus is a pen plotter, and wherein:

(a) the light source emits light at near infrared frequencies and is disposed on a first side of the vessel at a point near the bottom of the vessel;

(b) the light sensor is disposed on a second side of the vessel generally opposed to the light source;

(c) the vessel is a plotting pen and portions of the plotting pen interposed between the light source and the light sensor are transparent to light emitted by the light source;

(d) the liquid is plotting pen ink; and (e) the turbulent surface of the liquid is created by movements of a pen plotter pen carriage holding said plotting pen.

19. The apparatus of claim 18 further comprising a low ink level signal means for signaling a user, and wherein the logic means interrupts plotting operations in the pen plotter and activates the low ink level signal means whenever the ink has fallen to the level in the plotting pen where the ink is substantially expended.

20. The apparatus of claim 18 wherein the pen plotter has plural plotting pens more than one of which is employed in a plotting operation, and wherein the logic means interrupts the plotting operation only after all the plotting pens being employed in the plotting operation have been used.

* * * * *